Figure 1:
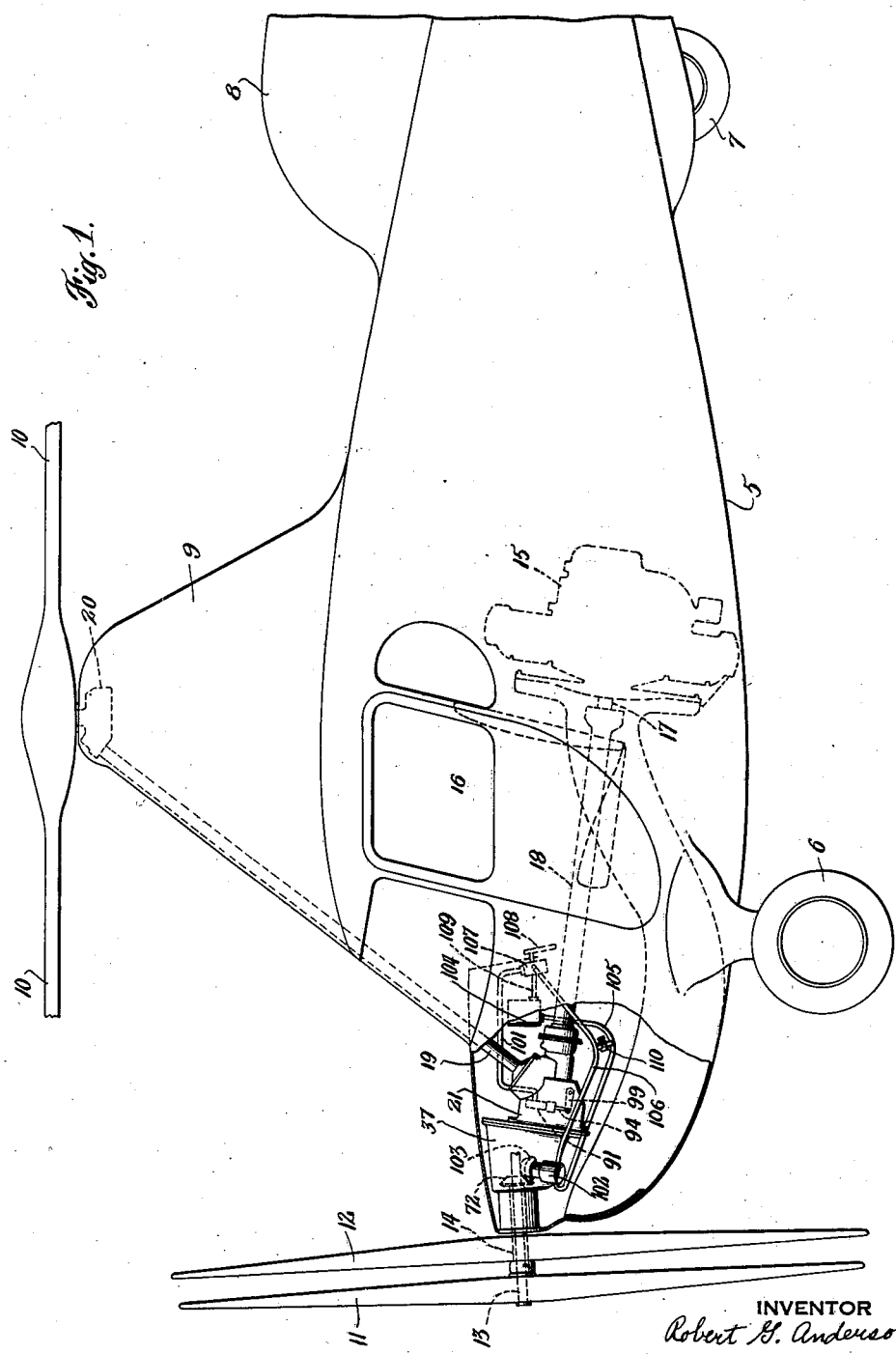

Oct. 15, 1940.                R. G. ANDERSON                2,217,883
                           ROTATIVE WINGED AIRCRAFT
                        Filed Oct. 17, 1938        4 Sheets-Sheet 1

INVENTOR
Robert G. Anderson
BY
Synnestvedt + Lechner
ATTORNEYS

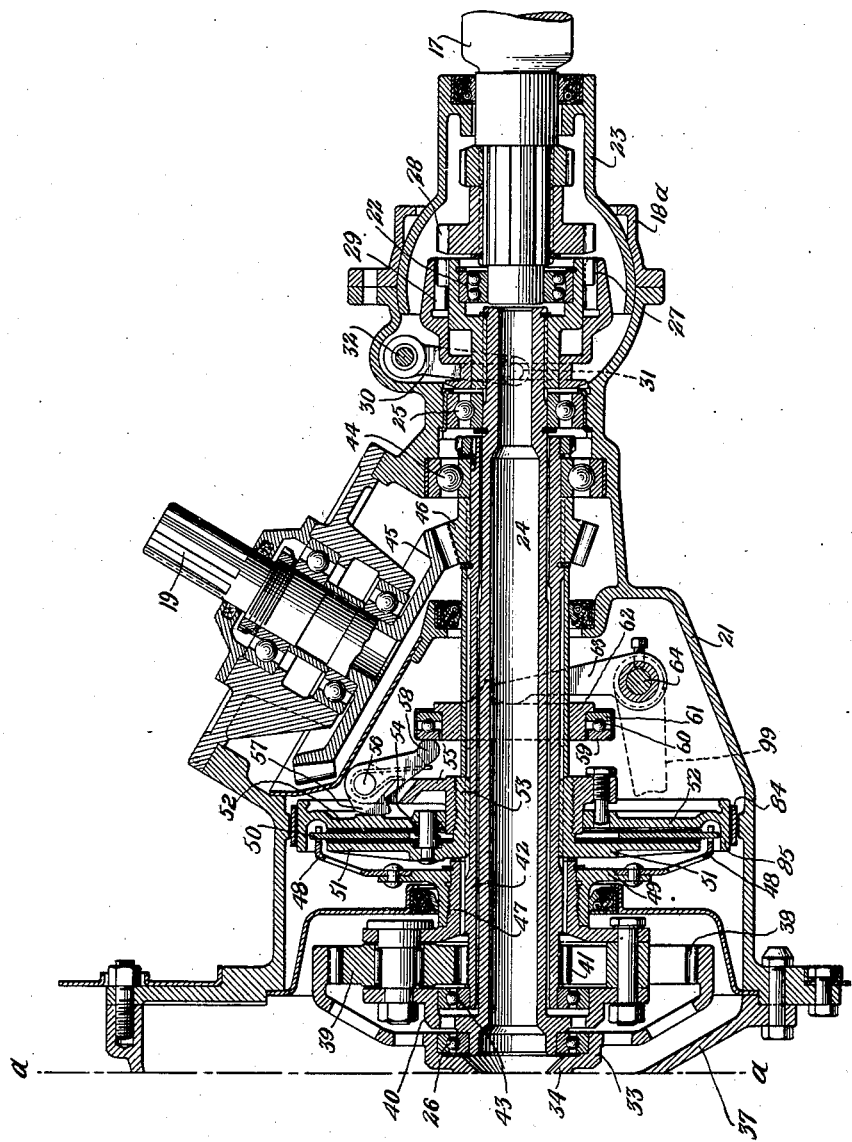

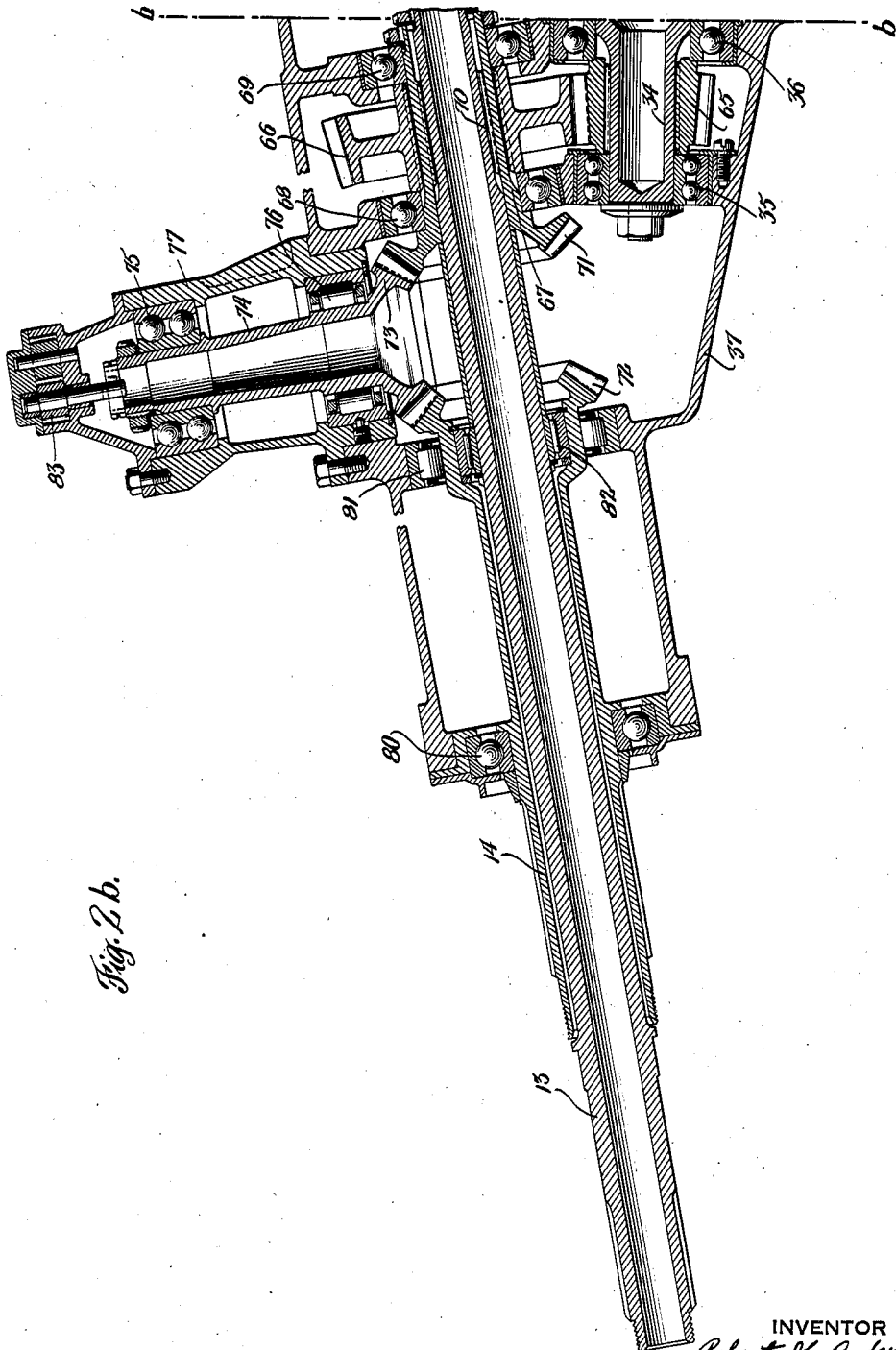

Oct. 15, 1940.   R. G. ANDERSON   2,217,883
ROTATIVE WINGED AIRCRAFT
Filed Oct. 17, 1938   4 Sheets-Sheet 4
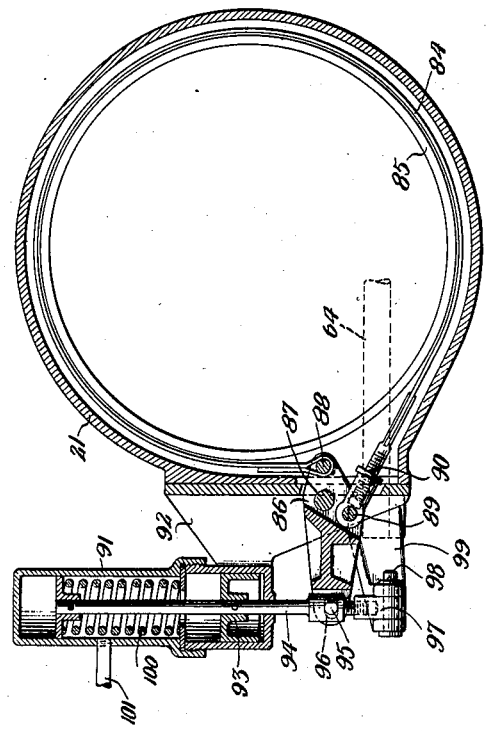
INVENTOR
Robert G. Anderson
BY
Synnestvedt & Lechner
ATTORNEYS Patented Oct. 15, 1940

2,217,883

UNITED STATES PATENT OFFICE 2,217,883

ROTATIVE WINGED AIRCRAFT

Robert G. Anderson, Elmira, N. Y., assignor, by mesne assignments, to Autogiro Company of America, a corporation of Delaware Application October 17, 1938, Serial No. 235,448

16 Claims. (Cl. 244—18)

This invention relates to rotative winged aircraft and is especially concerned with the general type of craft in which a sustaining rotor is provided, capable of autorotational actuation in flight, and in which one or more propulsive air screws are also provided, the air screw or air screws and rotor both being adapted to be driven by a single engine.

For the purpose of initiating rotation of the rotor prior to take-off from the ground, aircraft of the type just mentioned have been provided with power drive mechanism between the engine and rotor, which mechanism, in accordance with some arrangements, is operated to bring the rotor substantially up to normal flight speed prior to making a take-off run (as disclosed, for example, in Pecker U. S. Patent No. 1,999,636). In other arrangements (see, for example, copending application Serial No. 738,349, filed August 3rd, 1934, of Juan de la Cierva, assignor to the assignee of the present application) the power transmission mechanism is employed to drive the rotor up to a speed substantially in excess of the normal autorotational flight speed, with the blades of the rotor set at low or zero pitch, the clutch in the rotor drive then disconnected and the blade pitch brought to a positive value sufficient to effect "jump" take-off.

The present invention is concerned with an improved rotor and air screw drive mechanism for aircraft particularly of the types discussed above, the invention being of especial usefulness in a machine capable of "jump" take-off. The invention is, therefore, described hereinafter with particular reference to this last mentioned type of craft.

For the purpose of making an effective jump take-off, it is desirable that a relatively large proportion of the total power of the engine be delivered to the rotor while the machine is on the ground, in order to obtain sufficiently high rotation of the rotor to secure a high initial lift. If the propulsive air screw of the machine remains connected with the engine during driving of the rotor, the drive of the air screw consumes a substantial portion of the power output of the engine, and has the further disadvantage of developing a high thrust, making it difficult to retain the machine at the starting point until it is desired to leave the ground. On the other hand, if the air screw is completely disconnected from the engine during driving of the rotor in preparation for take-off, when the take-off is actually made, a substantial period of time elapses before the air screw can be brought up to flight speed. This is also a disadvantage in view of the fact that an effective jump take-off (or even an effective take-off following a run on the ground) requires that the maximum or at least a high air screw thrust be developed as quickly as possible after disconnection of the rotor drive clutch. The importance of this lies in the fact that as soon as the rotor drive clutch is disconnected the rotor, of course, commences to lose its speed and impair the take-off characteristics.

With the foregoing in mind, the present invention provides a transmission mechanism for delivering power from the engine to the rotor and to the air screw, which transmission mechanism affords two speed air screw operation, the lower one of which is operative while the rotor is being driven, and the upper one of which is operative for take-off and flight purposes. In this way the interval of time elapsing between disconnection of the rotor drive clutch and the attainment of maximum air screw thrust is very substantially reduced and an improved take-off results.

The mechanism provided for the above purpose is also of advantage from a number of structural and functional aspects corollary to the foregoing, some of the important points being as follows:

The transmission mechanism provides the foregoing major objective without the necessity for employing any disconnectible gears.

The transmission mechanism also incorporates a control system providing, upon the manipulation of a single control organ, for drive of the air screw at reduced speed when the rotor is being driven, and for drive of the air screw at high speed conjointly with disconnection of the rotor drive.

The foregoing objects and advantages will be further amplified in the following description of the preferred embodiment of the invention, other objects and advantages also being brought out during the course of the description of the mechanism itself. In the drawings—

Figure 1 is a side outline elevational view of an aircraft equipped with a sustaining rotor, a propulsive air screw and an engine, with the improved transmission of this invention applied thereto, a portion of the fuselage being broken out toward the nose of the machine to better disclose the transmission mechanism;

Figures 2a and 2b, when placed together on the lines a—a and b—b, illustrate the transmission mechanism in longitudinal section;

Figure 3 is a transverse sectional view of certain parts of the mechanism shown in Figure 2a; and Figure 4 illustrates, in the manner of Figure 2b, a modified air screw mounting for association with the transmission mechanism.

In Figure 1, the body of the machine appears at 5, the same being shown as provided with front and rear landing wheels 6 and 7, tail surfaces such as shown fragmentarily at 8, and a rotor mount 9. The rotor preferably includes a plurality of blades 10—10 which, as disclosed for example in the aforementioned Cierva application Serial No. 738,349, are preferably pivotally connected with a common central hub by means of articulations providing freedom for up and down or "flapping" movement. In addition, as shown in said copending application, the blades may be provided with upwardly and outwardly inclined pivots by means of which lag and lead displacements of the blades are accompanied by pitch change thereof in a sense to provide for reduced pitch during driving of the rotor and increased pitch upon cessation of the driving torque, the said mechanism thereby being capable of effecting jump take-off.

Toward the nose of the machine a pair of propellers 11 and 12 are shown as being mounted, respectively, on shafts 13 and 14 which extend into the transmission mechanism described herebelow.

Figure 1 also shows the location of an engine at 15, to the rear of the occupant's compartment 16 relatively close to a downward projection of the rotor axis, this general engine disposition being more fully disclosed in copending application of Harold F. Pitcairn, James G. Ray and Agnew E. Larsen, Serial No. 14,304, filed April 2, 1935, issued October 3, 1939, as Patent No. 2,174,946, and assigned to the assignee of the present application. The engine shaft 17 is carried forwardly through a non-rotative sleeve 18 adapted to be joined to the rear of the transmission casing as by means of a fitting 18a appearing in Figure 2a.

Still referring to Figure 1, the rotor is adapted to be driven by means of shaft 19 which extends upwardly and rearwardly from the transmission, the upper end of this shaft being geared to the rotative part of the hub as by gearing enclosed within the casing diagrammatically shown at 20.

Turning now to the showing of the transmission in Figures 2a and 2b, the engine (or engine extension) shaft 17 is journalled within the transmission casing part 21 by means of a self-aligning bearing 22. Surrounding this end of the shaft 17 there is preferably provided a ball and socket joint between the part 18a and the sleeve 23, which are non-rotative parts, and which are associated as before indicated with the sleeve 18 for the engine shaft.

Central shaft 24 carried by bearings 25 and 26 has splined thereto at its rear end gear or dog teeth 27 in substantial alignment with similar teeth 28 carried by the shaft 17, these two sets of teeth being adapted to be coupled together by means of the cooperating device 29 which is slidable axially of the shafts by means of arm 30 and pin connection 31. Arm 30 is mounted on a shaft 32 which may be actuated in any suitable manner in order to connect and disconnect the transmission from the source of power, this being of advantage, for example, for purposes of road travel, as in said copending application above referred to, Serial No. 14,304.

The bearing 26 for shaft 24 (see left end of Figure 2a) is mounted within a socket 33 formed toward the rear end of an air screw driving shaft 34 (see Figure 2b), the shaft 34, in turn, being carried by bearings 35 and 36 which are mounted in the casing part 37.

Turning back to Figure 2a, it will be seen that the shaft 24 and the air screw driving shaft 34 are interconnected by a planetary gearing system, the internal gear 38 of which is rigid with the shaft 34 and the planet gears of which (one being shown at 39) are carried around their orbit by a support 40 which is rigid with the shaft 24. The center gear 41 of the planetary system is mounted on shaft 42 which is journalled at its adjacent end in a bearing 43 and at its remote end in a bearing 44. This shaft 42 is, in effect, a rotor driving shaft since the upwardly inclined rotor drive shafting 19 is geared thereto by means of the bevel gears 45 and 46.

Drive of the rotor is brought about by effectively clutching the rotor driving shaft 42 to the engine shaft 24. With this in mind, the supporting bracket or spider 40 for the planetary gears 39 has a cylindrical part 47 connected and moving therewith, which cylindrical part serves to support arms 48 by means of a flanged collar 49, the arms 48 being extended to engage the central disk or plate 50 of a friction clutch having a pair of outside disks 51 and 52. The disks 51 and 52 are movable with respect to each other and are both carried on a collar 53 which is keyed to the rotor driving shaft 42. The clutch plates 51 and 52 are normally retained in separated relation by spring devices 54, and the clutch may be brought into engagement by a plurality of toggle levers mounted on brackets such as shown at 55, by means of pivots 56, one arm or cam part 57 of each lever abutting against the clutch plate 52, and the other arm 58 being extended to contact with a race 59 of bearing 60. The other race 61 of this bearing is carried by the collar 62 which is non-rotatively mounted and adapted to be moved axially of the shafts by lever 63 which is mounted on an actuating shaft 64, this latter being controllable in a manner described hereinafter.

Examination of Figure 2a will show that engagement of clutch 50—51—52 serves to connect the rotor driving shaft 42 with the engine shaft 24, through the spider or supports for the planetary gears 39 which are rotatable with the shaft 24.

Since the center gear 41 of the planetary system is rigid with the rotor driving shaft 42, engagement of the clutch 50—51—52 locks out the planetary system, preventing rotation of all gears thereof and thus causing direct drive to be transmitted from engine shaft 24 not only to the rotor driving shaft 42, but also to the air screw driving shaft 34.

The drive from the air screw driving shaft 34 to the shafts 13 and 14 on which the two propellers 11 and 12 are respectively carried, is provided for by means of pinion 65 and cooperating gear 66, the former being keyed to shaft 34 and the latter keyed to a shaft 67 carried in bearings 68 and 69. Shaft 67, moreover, is rigid with the central propeller mounting shaft 13, being splined or keyed thereto as at 70.

For the purpose of driving the propeller shaft 14 in a direction opposite to that of the shaft 13, shafts 67 and 14 are provided with opposed bevel gears 71 and 72, respectively, both of which mesh with a cooperating gear 73 mounted on shaft 74, the axis of which extends at right angles to the axis of shafts 13 and 14, the shaft 74 being suitably journalled as by bearings 75 and 76 in a housing 77. The housing 77 is separable from the main casing 37 of the transmission and, when viewed as in Figure 1, this housing preferably projects to one side of the transmission casing (to provide for maintenance of the parts within the overall fuselage contour) rather than in the upward direction appearing in Figure 2d, in which the casing 77 has been moved around for purposes of convenient illustration. Functionally, the elements mounted within housing 77 may be positioned at any point above the axis of shafts 13 and 14. This general type of mechanism providing reverse driving of tandem propellers is described and claimed in copending application of Harris S. Campbell, Serial No. 131,994, filed March 20th, 1937.

The propeller shaft 14 is carried in the transmission casing by bearings 80 and 81, and the shaft 13 is carried by a bearing 82 interposed between shaft 14 and shaft 13 and also by the bearings 68 and 69 which mount the shaft 67, which latter is rigid with shaft 13.

A gear pump for circulating lubricant in the transmission casing may conveniently be connected to the stub or countershaft 74, as appears toward the top of Figure 2b at 83.

The rotor driving shaft 42 may be restrained as against rotation by means of a friction braking device including a brake band 84 adapted to cooperate with brake drum 85 formed with plate 52 of the clutch assembly. This brake band appears to best advantage in Figure 3, in which the actuating mechanism therefor is also shown. The band may be tightened by a lever device 86 pivotally mounted at 87, to which the opposite ends of the band are fastened at 88 and 89, in such positions that movement of the device 86 about its pivot 87 in one direction tightens the band, and in the opposite direction loosens the band. A brake band adjustment 90 may be included.

The device 86 for operating the friction band 84 and the shaft 64 for actuating the clutch are preferably controlled through a common mechanism, for the description of which particular reference is made to Figures 1 and 3. A piston and cylinder device is used for control purposes, the cylinder 91 being rigidly mounted by a bracket 92 on the transmission casing part 21. Piston 93 of this device is provided with a stem 94 connected to one end of the lever device 86 for the friction band by a pin 95 working in a slot 96. The piston stem 94 is also extended for connection with the fitting 97 which is pivotally mounted on a pin 98 at the free end of lever 99 rigidly secured to clutch actuating shaft 64 (see also Figure 2a).

Thus by actuation of the piston 93 the friction band 84 and the rotor driving clutch are simultaneously controlled, the clutch being connected when the friction band is released and disconnected when the friction band is tightened. Normally, the compression spring 100 in the cylinder and piston device urges the piston 93 to an upper position in which the friction band 84 is tightened and the rotor driving clutch disengaged. Introduction of pressure through the connection 101 causes the piston 93 to move downwardly to the position shown in Figure 3, in which the friction band is released and the rotor driving clutch engaged.

The system for supply and control of fluid pressure delivered to cylinder 91 through connection 101 is shown in Figure 1. A fluid pump 102 is provided with an actuating gear 103 adapted to mesh with bevel gear 72 through which propeller mounting shaft 14 is driven (see Figure 2b). A fluid supply reservoir is shown at 104, connection 105 being extended therefrom to the pump 102. The delivery side of the pump is connected by means of pipe 106 with a valve 107 controllable in the cockpit or cabin of the craft by means of handle 108. This valve also has a return connection 109 extended to the reservoir 104 and serves alternatively to couple pressure line 106 either with the return connection 109 or with the pipe 101 which extends to the actuating cylinder 91. A pressure limiting by-pass valve 110 is desirably connected between the pipes 105 and 106.

Before describing the operation of the mechanism, brief reference is made to the modified showing of Figure 4 which is provided for the purpose of adapting the transmission mechanism to the drive of a single propeller. Here only a single propeller mounting shaft 14a is employed, this shaft carrying the propeller hub as indicated at 12a, and being journalled by the bearings 80a, 81a, 68a and 69a, which, it will be seen from comparison of Figures 4 and 2a, correspond to similar bearings provided in the embodiment first described. The driving gear 66a is directly splined or keyed to the single propeller mounting shaft 14a.

Since direction reversing mechanism is not here necessary, the unit illustrated in Figure 2b, comprising housing 77 and the shaft and bearings thereof, may be completely eliminated and this unit replaced by a simple plate closure for the opening in the casing 37, as shown at 111. A gear 72a is preferably mounted on shaft 14a for the purpose of driving the gear 103 associated with the fluid pump provided for the control system as described above in connection with Figure 1.

Thus, by the substitution of only a few parts, the entire transmission system may readily be adapted either to the drive of a single propeller or to the reverse drive of two propellers mounted in tandem.

In operation, when it is desired to effect take-off, the valve control handle 108 is actuated to introduce fluid pressure into the cylinder 91, in consequence of which the friction band 84 is released and the rotor driving clutch connected. This results in drive of the propellers at lower speed than in normal flight and thereby enables transmission of the desired torque to the rotor for rotor starting purposes. When the rotor has attained adequate speed for the type of take-off contemplated (either take-off after a run on the ground or "direct" take-off as mentioned above) the valve actuating handle 108 is moved to release the pressure in cylinder 91, which movement, under the influence of return spring 100, serves to disconnect the rotor driving clutch and to tighten the friction band 84 so as to arrest rotation of the rotor driving shaft 42 and thereby place the planetary gearing system in operation, which provides a higher propeller speed.

By way of illustration of gear ratios suitable for the purposes of this invention, the reduction between air screw driving shaft 34 and the air screw mounting shafts 13 and 14 (the reduction being provided by means of gears 65 and 66) may be 2 to 1. Thus when the planetary gearing system is locked out, the air screw mounting shafts rotate once for each two revolutions of the engine shaft 24. With the arrangement illustrated, the over-drive provided by the planetary gearing system is 1.28 to 1, i. e., the air screw driving shaft 34 rotates 1.28 times for each revolution of the engine shaft 24. Thus, when the planetary system is in use, the reduction provided by gears 65 and 66 and the over-drive provided by the planetary system results in a net reduction of 1.56 to 1, i. e., one revolution of the propeller mounting shafts upon 1.56 revolutions of the engine shaft 24.

With regard to the operation of the friction band 84, it is especially to be noted that only a relatively small torque is delivered thereto, because of the point of application of the drag with respect to the position of the planetary gears in the transmission system. With gear ratios of the type illustrated, only about one-fifth to about one-quarter of the total engine torque is imposed upon the brake band 84.

By the provision of drive mechanism providing for two different speeds of propeller rotation for a given engine speed, the amount of power desired for transmission to the rotor can readily be obtained, and this while rotating the propellers at a medium speed, in consequence of which at the moment of take-off, the propeller speed very quickly increases to the maximum, which is of especial advantage in effecting "direct" take-off, because of the relatively short period of time during which substantial kinetic energy is available in the rotor.

Various features of the transmission mechanism itself are also of advantage from a structural standpoint, it being mentioned that the parts employed are relatively few, considering the operations effected thereby, and are further of simple construction. The mechanism is easy to assemble, there being only two main casing parts (21 and 37), so that lubrication and maintenance may be readily effected.

What I claim is:

1. In an aircraft having a sustaining rotor, an air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, the said rotor and air screw driving shafts both being geared to said planet gear, controllable means for restraining said rotor driving shaft as against rotation, and a clutch for controlling the rotor drive, said clutch being operatively interposed between the rotor driving shaft and the engine shaft.

2. In an aircraft having a sustaining rotor, an air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, the said rotor and air screw driving shafts both being geared to said planet gear, controllable means for restraining said rotor driving shaft as against rotation, a clutch for controlling the rotor drive, said clutch being operatively interposed between the rotor driving shaft and the engine shaft, and means for interlocking the operation of said clutch and the said restraining means.

3. In an aircraft having a sustaining rotor, an air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, an internal gear connected with the air screw driving shaft and operatively associated with said planet gear, and a center gear connected with the rotor driving shaft and operatively associated with said planet gear.

4. In an aircraft having a sustaining rotor, an air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, an internal gear connected with the air screw driving shaft and operatively associated with said planet gear, a center gear connected with the rotor driving shaft and operatively associated with said planet gear, and controllable means for restraining the rotor driving shaft as against rotation.

5. In an aircraft having a sustaining rotor, an air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, an internal gear connected with the air screw driving shaft and operatively associated with said planet gear, a center gear connected with the rotor driving shaft and operatively associated with said planet gear, controllable means for restraining the rotor driving shaft as against rotation, and a disconnectible clutch operatively associated with the engine shaft and the rotor driving shaft.

6. For an aircraft having a sustaining rotor, a propulsive air screw and an engine, power transmission mechanism for delivering power from the engine to the air screw and to the rotor including a shaft connected with the engine, an air screw driving shaft, a planetary gearing system interconnecting said shafts, a planet gear of which is carried by the engine shaft, the internal gear of which is connected with the air screw driving shaft, and the center gear of which is provided with controllable means for restraining it as against rotation, a shaft connected with the air screw and geared to said air screw driving shaft through reduction gearing, and disconnectible driving means for interconnecting the engine shaft and the rotor.

7. For an aircraft having a sustaining rotor, a propulsive air screw and an engine, power transmission mechanism for delivering power from the engine to the air screw and to the rotor including a shaft connected with the engine, an air screw driving shaft, a planetary gearing system interconnecting said shafts, a planet gear of which is carried by the engine shaft, the internal gear of which is connected with the air screw driving shaft, and the center gear of which is provided with controllable means for restraining it as against rotation, and disconnectible driving means for interconnecting the engine shaft and the rotor.

8. For an aircraft having a sustaining rotor, a propulsive air screw and an engine, transmission mechanism for delivering power from the engine to the rotor and to the air screw including means for connecting and disconnecting the drive to the rotor, means providing for drive of the air screw at different speeds with a given engine speed, and a control system for said last two means providing interlocked operation thereof such that the air screw is operated at a lower speed when the rotor drive is connected than when the rotor drive is disconnected.

9. For an aircraft having a sustaining rotor, a propulsive air screw and an engine, transmission mechanism for delivering power from the engine to the rotor and to the air screw including means for connecting and disconnecting the drive to the rotor, means providing for drive of the air screw at different speeds with a given engine speed, and a control system for said last two means incorporating a fluid pump, a fluid pressure operable piston and cylinder device connected with both of said two means, and a manually operable element for controlling the supply of fluid to and from said cylinder.

10. For an aircraft having a sustaining rotor, a propulsive air screw and an engine, transmission mechanism for delivering power from the engine to the rotor and to the air screw including means for connecting and disconnecting the drive to the rotor, means providing for drive of the air screw at different speeds with a given engine speed, and a control system for said last two means incorporating a fluid pump, a fluid pressure operable piston and cylinder device connected with both of said two means and providing upon actuation thereof for drive of the air screw at a higher speed when the rotor drive is disconnected than when the rotor drive is connected, with a given engine speed, and a manually operable element for controlling the supply of fluid to and from said cylinder.

11. In an aircraft having a sustaining rotor, an air screw and an engine, transmission mechanism for delivering power from the engine to the rotor and to the air screw including a shaft connected with the engine, an air screw driving shaft, a planetary gearing system interconnecting the engine and air screw shafts, means for locking out the planetary gearing system to provide direct drive between the engine shaft and the air screw driving shaft, and disconnectible means for clutching the rotor to the engine shaft.

12. For an aircraft having a sustaining rotor, a propulsive air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, the internal gear of which is connected with the air screw driving shaft, and the center gear of which is connected with the rotor driving shaft, a brake drum associated with the rotor driving shaft, a cooperating controllable brake band for arresting rotation of the rotor driving shaft, and controllable clutch means between the rotor driving shaft and the engine shaft.

13. For an aircraft having a sustaining rotor, a propulsive air screw and an engine, transmission mechanism for delivering power from the engine to the rotor and to the air screw including a shaft connected with the engine, a rotor driving shaft, an air screw driving shaft, a planetary gearing system, a planet gear of which is carried by the engine shaft, the internal gear of which is connected with the air screw driving shaft, and the center gear of which is connected with the rotor driving shaft, a brake drum associated with the rotor driving shaft, a cooperating controllable brake band for arresting rotation of the rotor driving shaft, controllable clutch means between the rotor driving shaft and the engine shaft, and means providing interlocked operation of the said brake band and the clutch means such that release of the brake band is accompanied by connection of the clutch and engagement of the brake band is accompanied by disconnection of the clutch.

14. An aircraft comprising an engine, a propulsive air screw and a sustaining rotor both adapted to be driven by the engine, the rotor incorporating sustaining wing means mounted for variation in pitch between a non-lifting setting and a substantially positive setting and arranged to provide for direct take-off by rotation thereof at a high speed while on the ground with the wing means at a non-lifting setting and by subsequent disconnection of the rotor drive and increase of the wing pitch to a substantially positive value, and transmission mechanism for delivering power from the engine to the air screw and to the rotor including a clutch for connecting and disconnecting the rotor drive, means for driving the air screw at different speeds with a given engine speed, and means interlocking the operation of said last means and the rotor clutch and providing for drive of the air screw at a lower speed when the rotor clutch is engaged than when the rotor clutch is disengaged, with a given engine speed, thereby making available adequate power for driving the rotor to a high speed prior to take-off and providing for rapid increase of air screw speed in the direct take-off maneuver at the time of disconnection of the rotor clutch and raising of the wing pitch, whereby to avoid loss of altitude during conversion of flight operation from the condition of direct take-off to the condition of translational flight.

15. For an aircraft having a sustaining rotor, a propulsive air screw and an engine, transmission mechanism for delivering power from the engine to the rotor and to the air screw including means for connecting and disconnecting the drive to the rotor, means providing for drive of the air screw at different speeds with a given engine speed including a member selectively rotatable and stationary to alter the speed of the air screw, and a device for controlling rotation of said member and providing for a smooth transition between the rotating and stationary conditions of said member, and a control for said two means providing interlocked operation thereof such that the air screw is operated at a lower speed when the rotor drive is connected than when the rotor drive is disconnected.

16. For an aircraft having a sustaining rotor, a propulsive air screw and an engine, transmission mechanism for delivering power from the engine to the rotor and to the air screw including means for connecting and disconnecting the drive to the rotor, means providing for drive of the air screw at different speeds with a given engine speed, and a control for said two means providing interlocked operation thereof such that the air screw is operated at a lower speed when the rotor drive is connected than when the rotor drive is disconnected, said control incorporating a friction device providing a smooth transition in change of air screw speed.

ROBERT G. ANDERSON.